US009762311B2

United States Patent
Ling et al.

(10) Patent No.: US 9,762,311 B2
(45) Date of Patent: *Sep. 12, 2017

(54) METHOD AND SYSTEM FOR A MESH NETWORK OF SATELLITE RECEPTION ASSEMBLIES

(71) Applicant: Maxlinear, Inc., Carlsbad, CA (US)

(72) Inventors: Curtis Ling, Carlsbad, CA (US); Timothy Gallagher, Carlsbad, CA (US); Glenn Chang, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/206,438

(22) Filed: Jul. 11, 2016

(65) Prior Publication Data

US 2017/0111105 A1 Apr. 20, 2017

Related U.S. Application Data

(63) Continuation of application No. 14/733,210, filed on Jun. 8, 2015, now Pat. No. 9,391,689, which is a
(Continued)

(51) Int. Cl.
*H04B 7/185* (2006.01)
*H04W 84/10* (2009.01)
(Continued)

(52) U.S. Cl.
CPC ..... *H04B 7/18515* (2013.01); *H04B 7/18523* (2013.01); *H04W 76/04* (2013.01)

(58) Field of Classification Search
CPC .... H04B 7/185; H04B 7/1851; H04B 7/1853; H04B 7/18513; H04B 7/18515; H04B 7/18517; H04B 7/18519; H04B 7/18523; H04B 7/18526; H04B 7/18528; H04B 7/18578; H04B 7/1858; H04B 7/18582; H04B 7/18584; H04B 7/18586;
(Continued)

(56) References Cited

U.S. PATENT DOCUMENTS 6,356,569 B1 3/2002 Sonalkar et al.
7,567,777 B2 * 7/2009 Myers ............... B60R 11/0235
455/12.1

(Continued)

OTHER PUBLICATIONS

Int'l Search Report and Written Opinion for PCT/US2013/024696 dated Apr. 15, 2013.
(Continued)

*Primary Examiner* — Philip Sobutka
(74) *Attorney, Agent, or Firm* — Mcandrews, Held & Malloy

(57) ABSTRACT

A satellite reception assembly that provides satellite television and/or radio service to a customer premises may comprise a wireless interface via which it can communicate with other satellite reception assemblies. Wireless connections between satellite reception assemblies may be utilized for providing satellite content between different satellite customer premises. Wireless connections between satellite reception assemblies may be utilized for offloading traffic from other network connections.

17 Claims, 14 Drawing Sheets

Related U.S. Application Data continuation of application No. 13/715,250, filed on Dec. 14, 2012, now Pat. No. 9,055,405.

(60) Provisional application No. 61/595,654, filed on Feb. 6, 2012.

(51) Int. Cl.
*H04H 20/08* (2008.01)
*H04H 40/90* (2008.01)
*H04W 76/04* (2009.01)

(58) Field of Classification Search
CPC ........... H04B 7/18589; H04B 7/18591; H04H 20/08; H04H 40/90; H04H 60/21; H04H 60/23; H04N 21/4524; H04N 21/61; H04N 21/6193; H04N 21/64322; H04W 84/10; H04W 84/12; H04W 84/18
USPC ..... 725/63, 67, 68, 81; 455/3.01, 3.02, 3.06, 455/12.1
See application file for complete search history.

(56) References Cited

U.S. PATENT DOCUMENTS

| | | | |
|---|---|---|---|
| 8,266,657 B2* | 9/2012 | Margulis | H04L 12/2838 725/120 |
| 9,055,405 B2* | 6/2015 | Ling | H04H 20/08 |
| 9,391,689 B2* | 7/2016 | Ling | H04H 20/08 |
| 2002/0154055 A1 | 10/2002 | Davis et al. | |
| 2007/0220584 A1 | 9/2007 | Lee et al. | |
| 2008/0216126 A1* | 9/2008 | Perlman | H04W 4/16 725/64 |
| 2011/0116482 A1 | 5/2011 | Ansari | |
| 2011/0158149 A1 | 6/2011 | Mugulavalli et al. | |
| 2011/0169688 A1 | 7/2011 | Wyler | |

OTHER PUBLICATIONS

Dulac et al. Satellite Direct-to-Home. Proceedings of the IEEE, vol. 94, No. 1 Jan. 2006. [retrieved on Mar. 29, 2013] Retrieved from the Internet: <URL:http://www.img.lx.it.ptl-fp/cavlAdditional_material/Satellite%20Direct-to-Home.pdf> entire document.

* cited by examiner

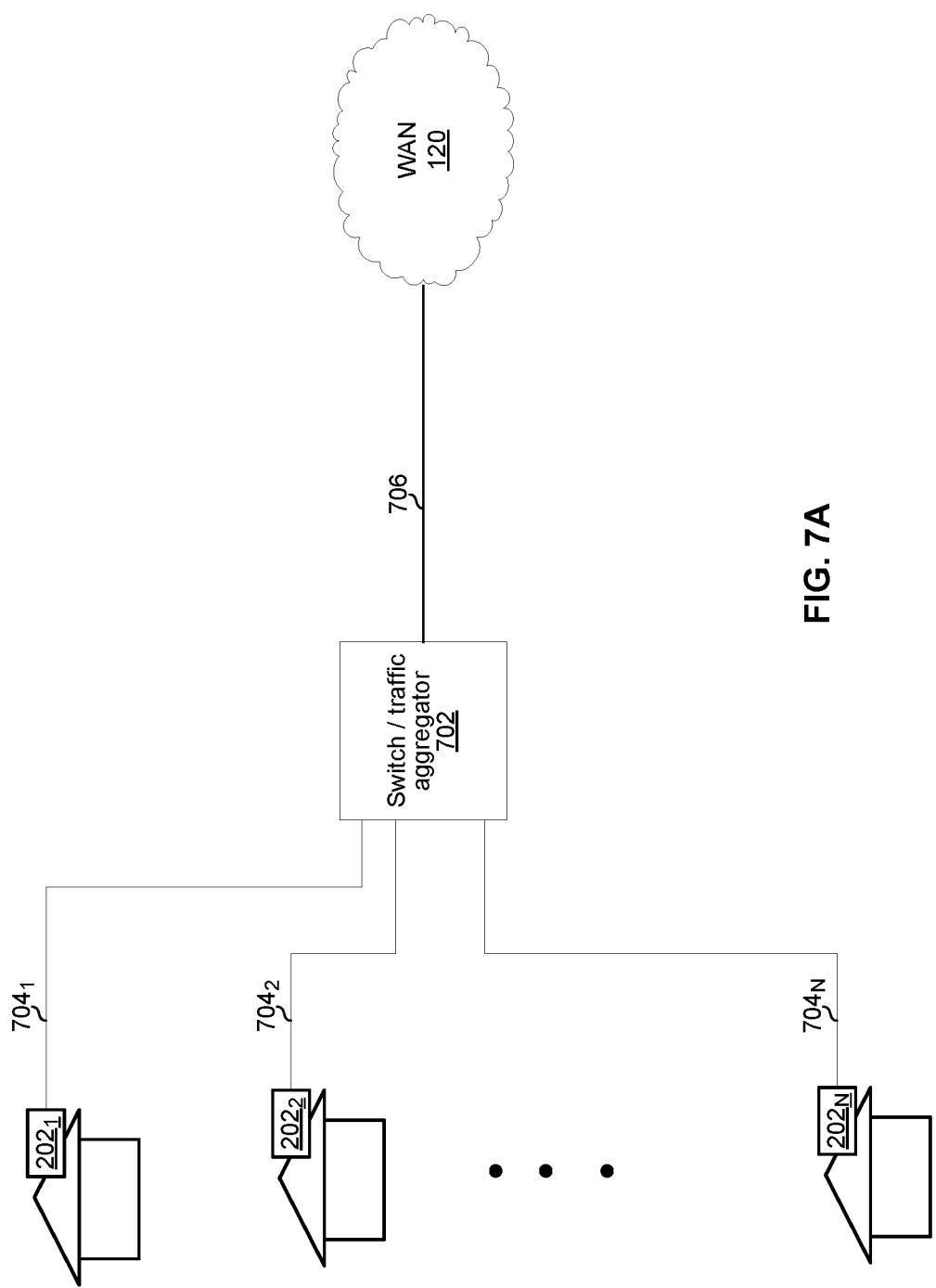

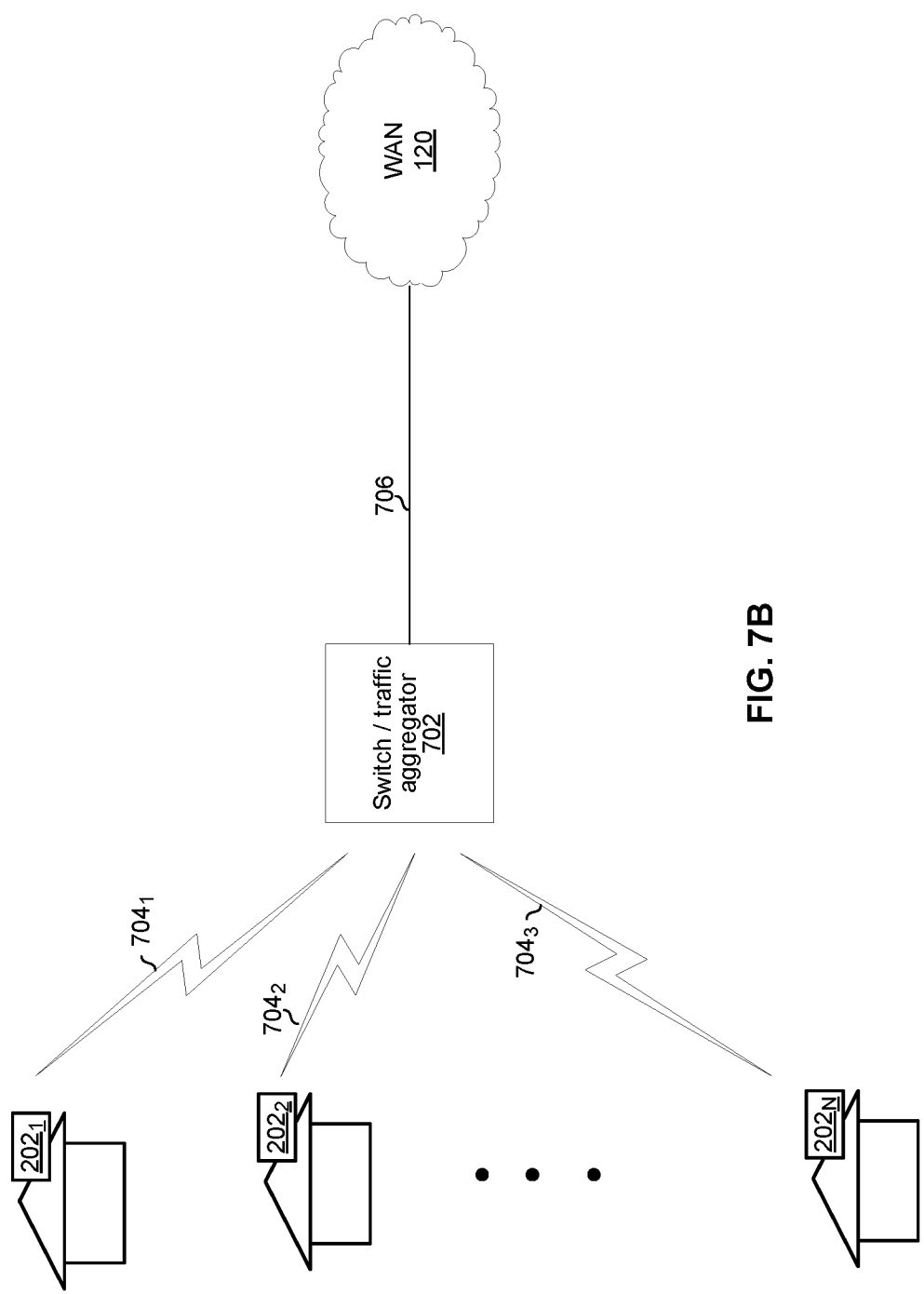

METHOD AND SYSTEM FOR A MESH NETWORK OF SATELLITE RECEPTION ASSEMBLIES

CLAIM OF PRIORITY

This patent application is a continuation of U.S. application Ser. No. 14/733,210 filed Jun. 8, 2015, which is a continuation of U.S. application Ser. No. 13/715,250 filed Dec. 14, 2012 now U.S. Pat. No. 9,055,405 and makes reference to, claims priority to and claims benefit from U.S. Provisional Patent Application Ser. No. 61/595,654 entitled "Method and System for an Internet Protocol LNB (IP LNB)" and filed on Feb. 6, 2012, now expired. Each of the above-identified documents is hereby incorporated herein by reference in its entirety.

INCORPORATION BY REFERENCE

This patent application makes reference to:
U.S. Pat. No. 9,055,329 titled "System and Method in a Broadband Receiver for Efficiently Receiving and Processing Signals" and filed on Dec. 14, 2011;
U.S. Pat. No. 8,466,850 titled "Method and System for Multi-Service Reception" and filed on Jul. 11, 2012;
U.S. Pat. No. 8,929,278 titled "Method and Apparatus for Content Protection and Billing for Mobile Delivery of Satellite Content" and filed on Aug. 15, 2012; and
U.S. Pat. No. 9,008,571 titled "Method and System for A Single Frequency Network for Broadcasting to Mobile Devices" and filed on Aug. 22, 2012.

Each of the above applications is hereby incorporated herein by reference in its entirety.

TECHNICAL FIELD

Aspects of the present application relate to electronic networking. More specifically, to a method and system for mesh network of satellite reception assemblies.

BACKGROUND

Existing electronic networks often suffer from poor user experience resulting from network failures, congestion, and/or other limited connectivity. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for a mesh network of satellite reception assemblies, substantially as illustrated by and/or described in connection with at least one of the figures, as set forth more completely in the claims.

BRIEF DESCRIPTION OF THE DRAWINGS

FIGS. 7A and 7B illustrate an example implementation in which multiple satellite reception assemblies are networked via a network switch.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "module" refers to functions than can be performed by one or more circuits. As utilized herein, the term "exemplary" means serving as a non-limiting example, instance, or illustration. As utilized herein, the terms "e.g.," and "for example," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As utilized herein, "data" can be any type of information (e.g., audio, video, pictures, text, etc.) and data being conveyed is referred to as "traffic."

Figure 1:
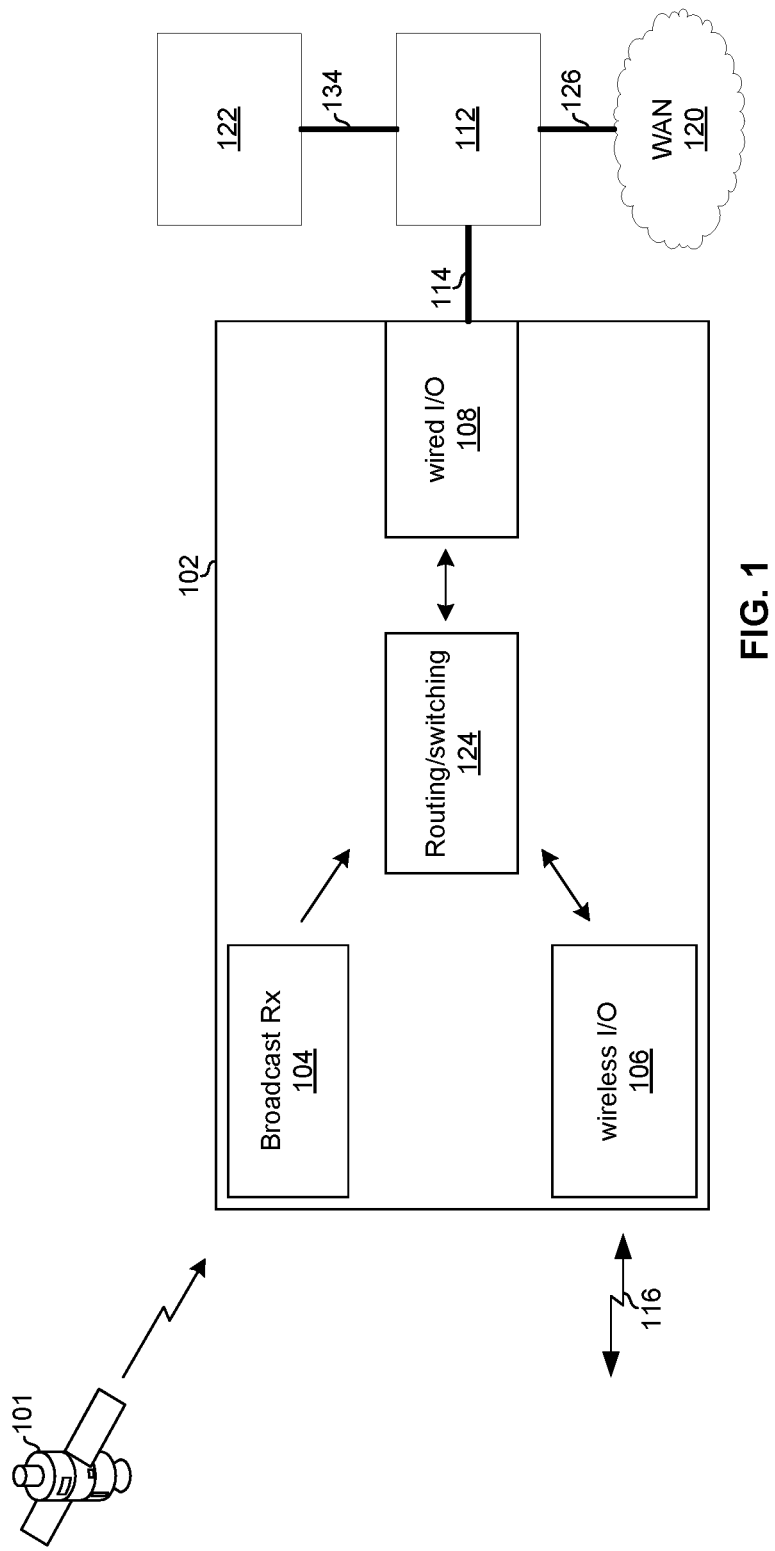
FIG. 1 depicts an example module that enables a mesh network of satellite reception assemblies.

FIG. 1 depicts an example module that enables a mesh network of satellite reception assemblies. Referring to FIG. 1, there is shown a satellite 101, a module 112, a client 122, a WAN 120, and an interface module 102 that comprises a broadcast receive module 104, a wireless input/output (I/O) module 106, a wired I/O module 108, and a routing module 124.

The satellite 101 may comprise any satellite transmitting on any frequency. In an example implementation, the satellite 101 may be a direct broadcast satellite (DBS) that transmits signals intended for direct viewing/consumption (sometimes referred to direct-to-home (DTH) signals), rather than for redistribution (e.g., as part of a cable television plant).

The modules 102 and 112 may be part of a local area network (LAN) and may be interconnected via a LAN technology such as Ethernet (e.g., Ethernet frames communicated over an Ethernet physical layer such as 10/100/1G/ 10G/40GBASE-T). In an example implementation, each port of the module 102 and the port of module 112 that connects to module 102 may share a common subnet address that is not shared with the port of the module 112 that connects to the WAN 120. The module 112 may interface the LAN to a wide area network (WAN) 120 over broadband connection 126 utilizing, for example, DOCSIS, DSL, Carrier Ethernet, ATM, Frame Relay, ISDN, x.25, and/or other suitable WAN technology. The WAN 120 may, for example, backhaul traffic between wireless I/O module 106 and a cellular core network.

The module 112 may be operable to direct (e.g., switch or route) traffic among the connection 114 to the module 108, the connection 134 to the client device 122, and the broadband connection 126 to the WAN 120. The module 112 may, accordingly, store routing tables and/or other information for managing traffic flows. In an example implementation, the module 112 may be operable to perform various layers of one or more networking protocol stacks (e.g., Ethernet, TCP/IP, DOCSIS, etc.). In an example implementation, the module 112 may be operable to transcode data between the various formats used on the connections 114, 134, and 126. In an example implementation, the module 112 may be operable to manage the connection(s) over which particular data is transmitted based on a class of service (and/or other characteristic(s)) of the traffic and/or on characteristics (e.g., latency, jitter, throughput, packet loss/error rates, etc.) of one or more of the connections 114, 116, and 126.

The client 122 may comprise, for example, a television, digital video recorder, personal computer, smartphone, tablet, or other end-user equipment which may receive, for example, media via the connection 134 which may utilize, for example, an HDMI, USB, DisplayPort, IEEE 1394, and/or some other suitable protocol(s).

The various components of the module 102 may reside in one or more housings and may comprise one or more printed circuit boards and/or one or more integrated circuits (e.g., one or more silicon die).

The broadcast receive module 104 may be operable to receive broadcast signals (e.g., satellite radio, satellite television, terrestrial radio, and/or terrestrial television signals) and process the received broadcast signals to recover data (e.g., audio, video content, and/or auxiliary data related to audio and/or video content) carried therein. Accordingly, various implementations of the module 102 may comprise features described in U.S. patent application Ser. No. 13/546,704 which is incorporated herein by reference as set forth above. In an example implementation, the module 104 may perform channelization such that specific channels, streams, programs, etc. from the module 104 can be selectively conveyed to the module 124. In an example implementation, the module 104 may output data in the form of MPEG transport stream(s) to the module 124. In an example implementation, the module 104 may encapsulate received data utilizing one or more protocols (e.g., Internet Protocol) for output to the module 124.

The wireless module 106 may be operable to establish one or more wireless connections 116 with one or more devices (e.g., a cellular handset, smartphone or tablet) and/or other instances of the wireless module 106. The connection(s) 116 may utilize any suitable protocol(s) such as, for example, IEEE 802.11 protocols, WiGig, WiMAX, cellular (e.g., LTE), etc. The wireless module 106 may be configured via one or more control signals (not shown) which may, in turn, be based on input (e.g., utilizing a protocol such as DiSEqC) from the module 112 and/or client devices such as the client device 122.

The wired module 108 may be operable to communicate data with module 112 via one or more connections 114 which may comprise, for example, one or more coaxial cables. In an exemplary implementation, the wired I/O module 108 may be operable to output, onto the connection(s) 114, L-band signals received from the module 104. Such signals may be output in instances that the module 112 is a legacy gateway. Additionally or alternatively, the module 108 may be operable to communicate over the connection(s) 114 utilizing Ethernet, Multimedia over Coax Alliance (MoCA), and/or any other suitable protocol(s). Such communications may be used, for example, when the module 112 is a gateway that is compatible with an IP-LNB as described in U.S. patent application Ser. No. 13/326,125, which is incorporated by reference above. In another exemplary implementation, the module 112 may support a wireless connection and the functionality of the wired module 108 may be subsumed by the module 106 and/or by a second wireless module. The wired module 108 may be configured via one or more control signals (not shown) which may, in turn, be based on input (e.g., utilizing a protocol such as DiSEqC) from the module 112 and/or client devices such as the client device 122.

The routing module 124 may be operable to selectively route data and/or signals between the modules 104, 106, and 108. The routing module 124 may, accordingly, store routing tables and/or other information for managing traffic flows. The routing may be based, for example, on IP addresses, TCP/UDP port numbers, packet identifiers (PIDs), stream identifiers, class of service (and/or other characteristic(s)) of the data to be routed, characteristics (e.g., latency, jitter, throughput, packet loss/error rate, etc.) on one or more of the links 116 and 114, and/or any other suitable parameters. For example, packets comprising a first PID may be sent to the module 106 and packets comprising a second PID may be sent to the module 108. In an example implementation, the module 124 may be a digital and/or analog crossbar. In an example implementation, the module 124 may perform an OSI layer-3 packet-routing function and/or an OSI layer-2 packet-switching function. The module 124 may be configured via one or more control signals (not shown) which may, in turn, be based on input (e.g., utilizing a protocol such as DiSEqC) from the module 112 and/or client devices such as the client device 122.

In operation of an example implementation, module 102 may provide satellite broadcast (e.g., television and/or radio) service to the client 122. In this regard, the broadcast Rx module 104 may receive a satellite signal (e.g., a DTH signal) and perform block down conversion to generate an L-band signal. The L-band signal may be conveyed to the module 108 for support of legacy gateways. The module 104 may also demodulate the L-band signal to recover one or more MPEG transport streams, channelize the transport stream(s) to recover one or more programs, and encapsulate the stream(s) and/or program(s) into one or more packet streams (e.g., utilizing IP or some other suitable protocol(s)). The one or more packet streams may be conveyed, via module 124, to the module 108. The module 108 may decapsulate, encode, modulate, encrypt, and/or otherwise process the packet stream(s) to generate signals suitable for transmission via the connection(s) 114. The module 112 may process the packet stream(s) (e.g., transcode from Ethernet to HDMI) and output the processed packet stream to the client 122 for viewing/listening/etc.

In addition, or instead, of conveying the packet stream(s) to the wired module 108, the module 124 may convey the packet stream(s) to the wireless module 106. The wireless module 106 may process the packet stream(s) (e.g., encapsulate IP packets into packets of one or more wireless protocols such as Wi-Fi, WiMAX, WiGig, or LTE) and transmit the wireless packets via one or more wireless connections 116. At least one wireless connection 116 may be a direct wireless connection to another or similar instance of module 106 residing in another instance of module 102. For example, the depicted module 102 may reside in a first satellite reception assembly installed on a first satellite customer's roof and the other instance of module 102 may reside in a second satellite reception assembly installed on a second satellite customer's roof. A "direct" wireless connection between a first instance of module 106 and a second instance of module 106 may be one which does not require any routing or packet switching between the first instance of module 106 and second instance of module 106. A "direct" wireless connection may, in some instances, traverse one or more physical layer devices (e.g., a repeater, a wireless to wired adaptor, wired to wireless adaptor, etc.) en route from one instance of module 106 to another instance of module 106.

In addition, or instead, of receiving satellite signals via the module 104, the module 102 may also receive signals via the module 106. Such signals may originate from, for example, mobile devices such as smartphones and tablets, and/or from other instances of the module 106. Signals received via the module 106 may be processed to recover one or more packet streams contained therein, and the packet stream(s) may be conveyed to the module 124 for conveyance to the module 108.

In an example implementation, the module 102 may be configured so that it can operate on backup battery power if there is a loss of AC power.

Figure 2:
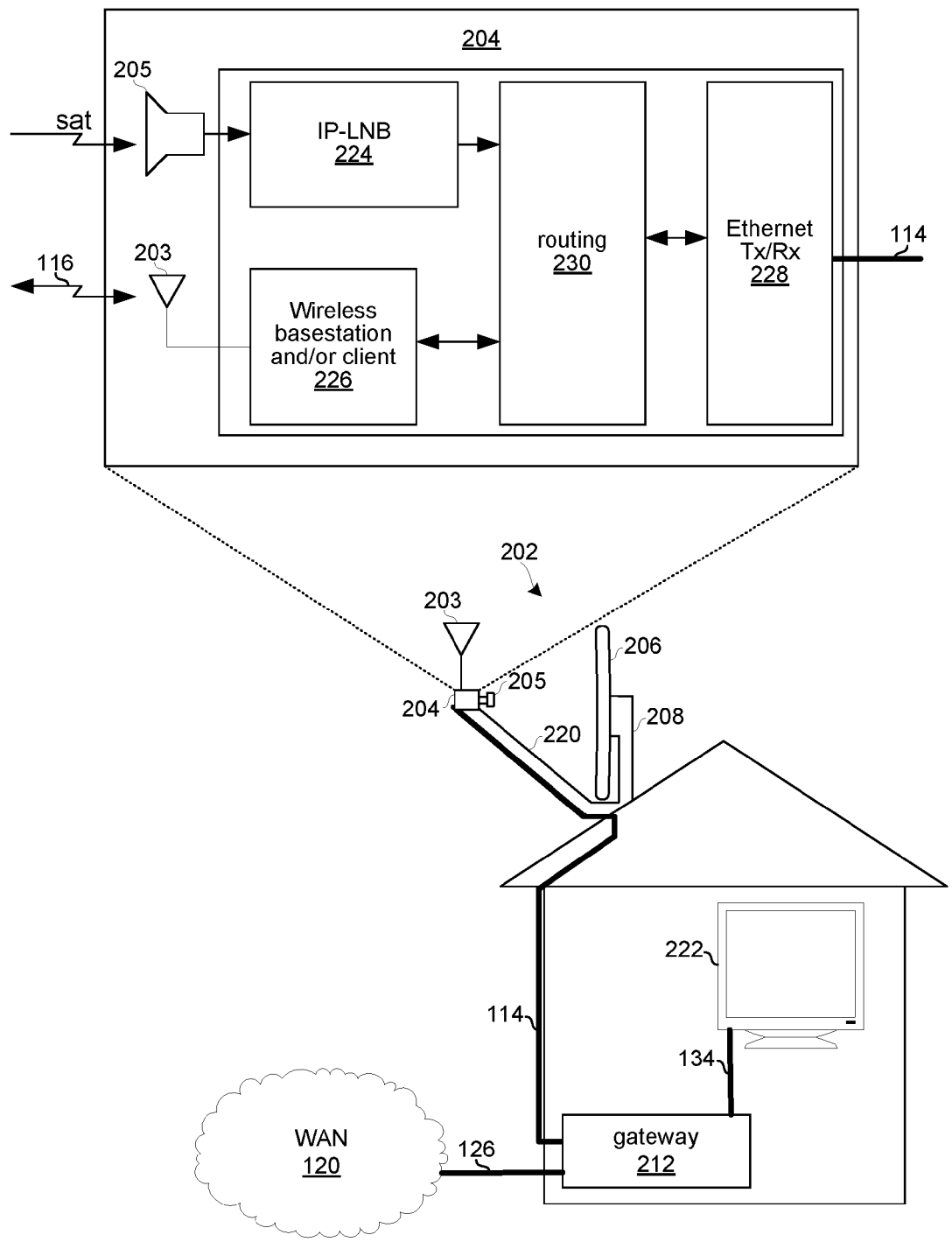
FIG. 2 depicts an example implementation in which of the interface module of FIG. 1 is part of a satellite reception assembly that is installed at a satellite customer premises.

FIG. 2 depicts an example implementation in which of the interface module of FIG. 1 is part of a satellite reception assembly that is installed at a satellite customer premises (e.g., a home or office of a direct broadcast satellite subscriber). In FIG. 2, there is shown the WAN 120, a gateway 212, a client 222, and satellite reception assembly 202. The satellite reception assembly comprises a support structure 208 having a boom 220 and to which a subassembly 204, an antenna 203, a feed horn 205, and a parabolic reflector 206 are mounted. While the satellite reception assembly 202 shown comprises a satellite dish assembly comprising parabolic reflector and a feed horn, the satellite reception assembly is not so limited. For example, a satellite reception assembly could comprise a planar or parabolic array of antenna elements and/or receiver circuitry whose signals are combined for satellite signal reception.

In the example implementation of FIG. 2, the subassembly 204 is depicted as a single physical assembly mounted to the support structure 208 of the satellite reception assembly 202. In other implementations, the subassembly 204 may comprise multiple physical assemblies, one or more of which may reside physically separate from the satellite reception assembly 202 and be connected to the satellite reception assembly 202 via one or more wired and/or wireless links.

In the example implementation of FIG. 2, the satellite reception assembly is mounted to a home or office of a satellite customer. In other example implementations, the satellite reception assembly may be mounted to another structure such as a broadcast tower, cellular tower, street or highway sign, billboard, building, etc.

The routing module 230 may be an implementation of the module 124 described above. Functions performed by the module 230 may comprise, for example, routing of data between the IP-LNB module 224, the cellular basestation module 226, and the Ethernet transceiver module 228. Although an implementation in which the routing module supports IP-based routing is described herein, any suitable protocols (e.g., Ethernet, PCIe, USB, etc.) can be utilized for communication of data between modules 224, 226, 230, and 228.

The Ethernet transceiver 228 may be an implementation of the module 108 described above. Functions performed by the module 228 may comprise encapsulation of data from the module 230 into Ethernet frames and transmission of the Ethernet frames onto the connection(s) 114 in accordance with Ethernet protocols. Additionally or alternatively, functions performed by the module 228 may comprise reception of Ethernet frames via the connection(s) 114, processing of the Ethernet frames to recover data carried therein (e.g., IP packets), and conveyance of the recovered data to the routing module 230.

The Internet Protocol LNB (IP-LNB) module 224 may be an implementation of the module 104 described above and may be as described in U.S. patent application Ser. No. 13/326,125, which is incorporated herein by reference, as set forth above. In this regard, the nomenclature "IP-LNB" indicates that the subassembly 204 possesses capabilities, including but not limited to support of the Internet Protocol, beyond the block downconversion of received satellite signals that is performed by conventional LNBs. Functions performed by the IP-LNB module 224 may comprise, for example, downconverting received satellite signals, demodulating received satellite signals, channelizing received satellite signals, and/or encapsulating data recovered from received satellite signals into IP packets.

The wireless basestation and/or client module 226 may be an implementation of the module 106 described above. The module 226 may support any one or more suitable wireless protocols such as cellular (e.g., LTE), Wi-Fi, WiMAX, WiGig, and/or a proprietary wireless protocol. The module 226 may be operable to function as an access point (AP) or basestation for communicating with client devices (e.g., mobile devices and/or other instances of the module 226 operating in a client mode). Additionally or alternatively, the module 226 may be operable to function as a client device for communication with one or more basestations or APs (e.g., other instances of the module 226 functioning as a base station or AP).

The client 222 may be a television or other television reception enabled device, for example, and may be an implementation of the client 122 described above.

The gateway 212 may be an implementation of module 112 described above. Functions performed by the gateway 212 may comprise reception, processing, and transmission of data. The gateway 212 may transmit and/or receive data to and/or from the module 228 (via connection(s) 114), the WAN 120 (via broadband connection 126), and/or one or more client devices 222 (via one or more links 234). For data from the module 228 to the client device 222 (e.g., providing satellite television service to the client 222), the gateway 212 may recover the data from Ethernet frames received over the connection(s) 114 and output the data to the client device 222 (e.g., in HDMI format). For data from the client 222 and/or gateway 212 to the module 228, the gateway 212 may encapsulate the data in one or more Ethernet frames and output the frames onto the connection(s) 114. For data between the WAN 120 and the module 228, the gateway 212 may perform OSI layer-2 switching and/or OSI layer-3 routing. Although the implementation shown in FIG. 2 uses wired links between the gateway 212 and module 228, and between the gateway 212 and WAN 120, other may utilize wireless links. Although the gateway 212 is depicted as separate from the subassembly 204, in other implementations at least a portion of the subassembly 204 may reside in and/or be implemented by the gateway 212, and vice versa.

Figure 3:
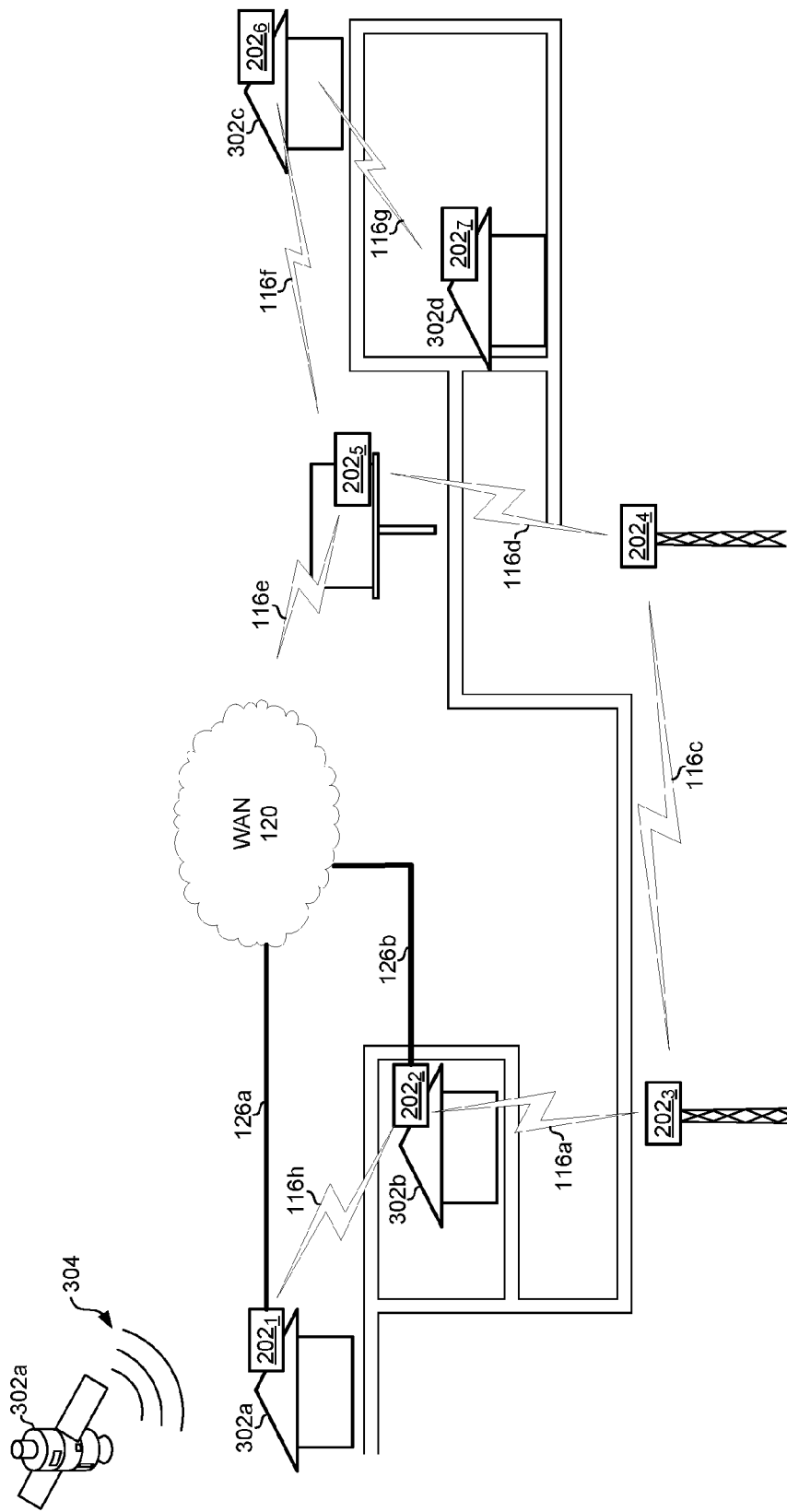
FIG. 3 depicts an example network of satellite reception assemblies.

FIG. 3 depicts an example network of satellite reception assemblies. Assemblies $202_1$, $202_2$, $202_5$-$202_7$ are installed at satellite customer premises (e.g., homes and/or offices which subscribe to satellite television or radio). Assemblies $202_3$ and $202_4$ are installed on cellular towers. The assemblies $202_1$-$202_7$ are interconnected via wireless connections 116a-116h and wired and/or optical connections 126a and 126b. In the example implementation of FIG. 3, the connections 126a and 126b may connect directly to the assemblies $202_1$ and $202_2$, respectively, or may be via respective gateways $212_1$ and $212_2$ not shown in FIG. 3.

In the example implementation shown in FIG. 3, the assemblies, $202_1$, $202_2$, $202_6$, and $202_7$ reside at satellite customer premises 302a, 302b, 302c, and 302d, respectively. Each customer premises may be, for example, a home or office of a satellite broadcast television customer.

In operation, data may be communicated between and among the assemblies $202_1$-$202_7$ via the wireless connections 116a-116h, the connections 126a and 126b, and/or the WAN 120. In this manner, multiple paths, one or more of which may bypass the WAN 120 and broadband connections such as connections 126a and 126b. Traffic from any one of the assemblies $202_1$-$202_7$ to any other one or more of the assemblies $202_1$-$202_7$ may traverse any combination of one or more of the connections 116a-116h, 126a, and 126b.

Accordingly, one of the connections 116a-116h, or a combination of a plurality of the connections 116a-116h, may serve as a backhaul connection to the WAN 120. Similarly, one of the connections 116a-116h ("single hop"), or a combination of a plurality of the connections 116a-116h ("multi-hop"), may enable traffic to be communicated among the satellite reception assemblies $202_1$-$202_7$ without the traffic having to traverse a third-party network controlled by an entity other than the satellite service provider (e.g., the WAN 120 or portions thereof).

Traffic communicated between satellite reception assemblies may comprise, for example, media content received from a satellite broadcast network, web-based media content, email and/or other general web traffic, cellular backhaul traffic, traffic that is part of a home and/or neighborhood alarm and alerting system, traffic for monitoring and/or controlling home appliances, traffic for monitoring and/or controlling energy consumption, traffic offloaded from other networks such as the WAN 120, and/or any other suitable traffic.

Example communication scenarios are described below with reference to FIGS. 4A-5B.

Figure 4A:
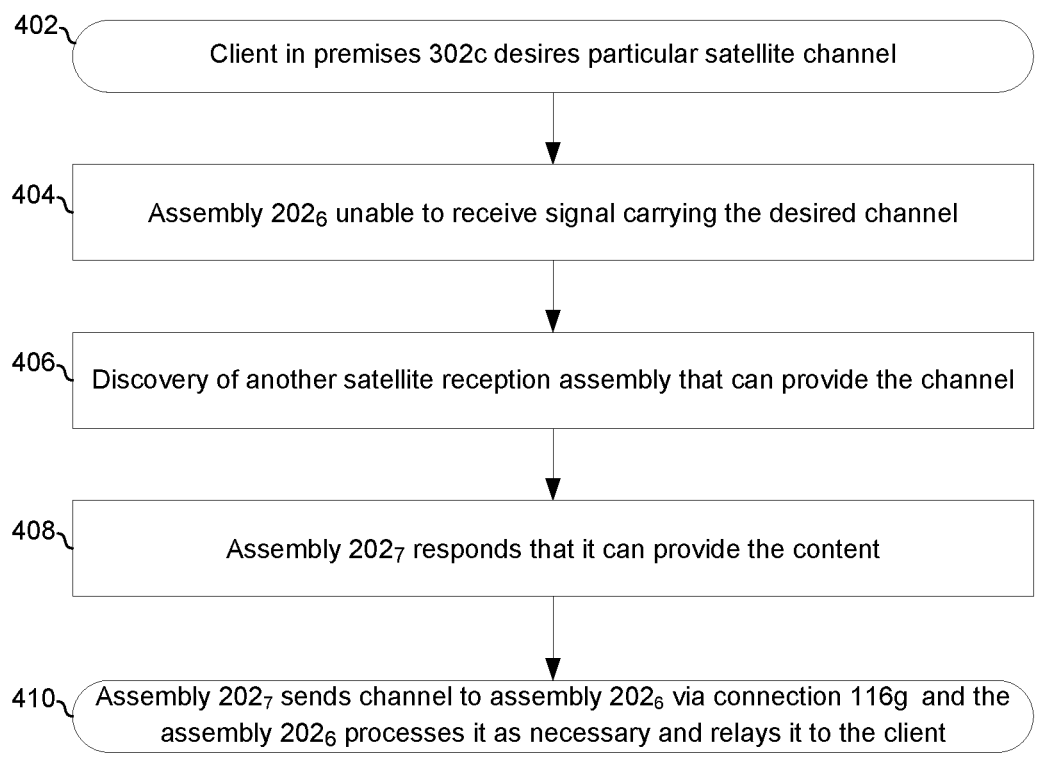
FIG. 4A is a flowchart illustrating the use of a network of satellite reception assemblies to provide satellite service in spite of poor reception of a satellite signal.

FIG. 4A is a flowchart illustrating the use of a network of satellite reception assemblies to provide satellite service in spite of poor reception of a satellite signal. In block 402, a client 122 installed at customer premises 302c may be desire to view a particular channel of a satellite broadcast television network.

In block 404, the satellite reception assembly $202_6$ may be unable to receive the satellite signal carrying the desired channel (e.g., because there is a physical obstruction in the way, or because the satellite reception assembly $202_6$ has been knocked out of alignment).

In block 406, the satellite reception assembly $202_6$ may participate in a discovery protocol to discover another satellite reception assembly that can provide the desired channel via one or more of the connections 116a-116h, 126a, 126b. The discovery protocol may comprise, for example, the satellite reception assembly $202_6$ transmitting a discovery request via its module 106 and/or its module 108 and listening for responses via its module 106 and/or its module 108. It may also include consulting a periodically-updated table of available reception assemblies which it maintains, or which is available by some other database.

In block 408, the satellite reception assembly $202_7$ responds that it can provide the channel via the connection 116g (perhaps in exchange for some form of payment or credit). For example, the satellite reception assembly $202_7$ may have a spare receive path that is not being used by clients in the premises 302d and thus, can be allocated for receiving the desired channel. As another example, the satellite reception assembly $202_7$ may already be providing the channel to a client in the premises 302d and, therefore, providing it to the satellite reception assembly $202_6$ may simply be a matter of replicating the output stream onto the connection 116g.

In block 410, the satellite reception assembly $202_7$ receives the desired channel, processes it as desired or necessary for output on the connection 116g, and transmits it onto the connection 116g. The satellite reception assembly $202_6$ receives the channel via connection 116g, processes it as desired or necessary for conveyance to the client 122, and outputs it to the client via its module 108.

Figure 4B:
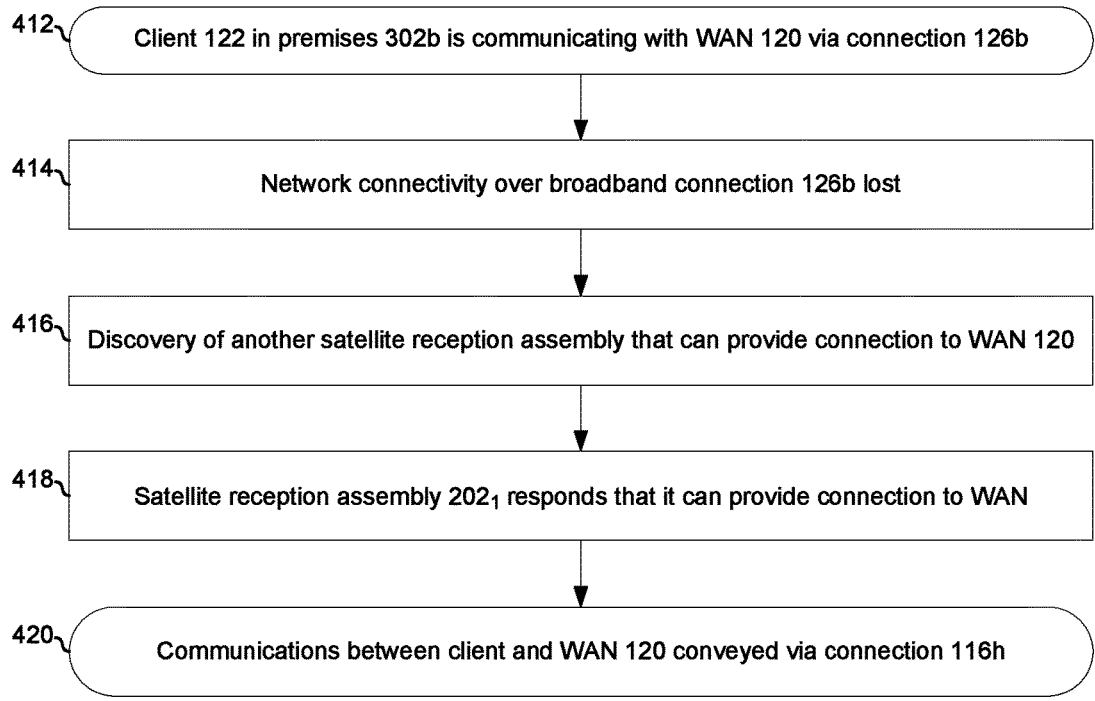
FIG. 4B is a flowchart illustrating the use of a network of satellite reception assemblies to maintain connectivity in spite of lost or congested broadband connection.

FIG. 4B is a flowchart illustrating the use of a network of satellite reception assemblies to maintain connectivity in spite of a lost or congested broadband connection. In block 412, a client 122 installed at customer premises 302b is communicating with WAN 120 via connection 126b.

In block 414, the client 122 becomes unable to communicate over the connection 126b. This may be, for example, due to congestion on the connection 126b, to a network failure, and/or due to traffic shaping algorithms being implemented on the connection 126b.

In block 416, the client 122 (or the gateway 112 via which the client 122 communicates over connection 126b) may notify the satellite reception assembly $202_2$ that it has lost WAN connectivity. In response, the satellite reception assembly $202_2$ may participate in a discovery protocol to discover another satellite reception assembly that can provide a connection to the WAN 120. The discovery protocol may comprise, for example, the satellite reception assembly $202_2$ transmitting a discovery request via its module 106 and/or its module 108 and listening for responses via its module 106 and/or its module 108.

In another exemplary implementation of the invention, rather than a request-based discovery protocol, satellite reception assemblies may advertise or broadcast availability of bandwidth and/or other resources. For example, where clients of a satellite reception assembly $202_X$ are not using all of its resources (e.g., when the residents of the satellite customer premises are sleeping or not home), the satellite reception assembly $202_X$ may advertise (e.g., via a signal broadcast via its module 106, via web site, etc.) that it has available resources which can be allocated for serving other satellite reception assemblies and their respective client devices. Satellite reception assemblies may maintain a routing table within 230 and periodically update these tables based on communication with other satellite reception assemblies. Similarly, a gateway 112 in premises 302b may be operable to detect available resources on connection 126 and/or connection 116h and advertise its ability to route traffic via the available resources.

In block 418, the satellite reception assembly $202_1$ responds that it can provide a connection to the WAN 120 (e.g., in exchange for some payment or credit). In this regard, the satellite reception assembly $202_1$ may communicate with a gateway and/or other device installed at customer premises 302a to determine that there is spare bandwidth on the connection 126a that can be allocated to handling traffic for the client 122 installed in customer premises 302b.

In block 420, communications between the client 122 and the WAN 120 may resume via the connection 116h and the connection 126b. In this manner, the network of satellite reception assemblies becomes the primary means by which broadband connectivity is provided to the premises 302b while the connection 126b is unavailable. The connection 126b may be unavailable because, for example, it is congested (e.g., as determined by the traffic on the connection 126b exceeding a determined threshold) or because it has failed. Such connectivity may, for example, supplement, perhaps on-demand, upstream and/or downstream bandwidth when upstream and/or downstream traffic on broadband connections such as the connections 126a and 126b rises above a determined threshold (e.g., a threshold set by a network administrator). For example, a DSL service provider may contract with a satellite service provider to provide such supplemental bandwidth in areas which have historically seen upstream traffic exceeding a particular threshold. Upstream and/or downstream traffic may then be offloaded to the network of satellite reception assemblies at times that the upstream and/or downstream bandwidth is too much for a DSL connection to handle.

Similar to the scenario of a lost connection, where a premises has no other broadband connection in the first place (e.g., premises 302d does not have a connection 126 to the WAN 120) the network of satellite reception assemblies may be the primary means of providing broadband connectivity to the premises. This may be advantageous, for example, where a network operator does not have the infrastructure (e.g., coaxial cable or fiber) in place to reach a premises (such as the premises 302d). That is, network of satellite reception assemblies may provide a quick, relatively low cost way to extend a service provider's coverage area.

Figure 4C:
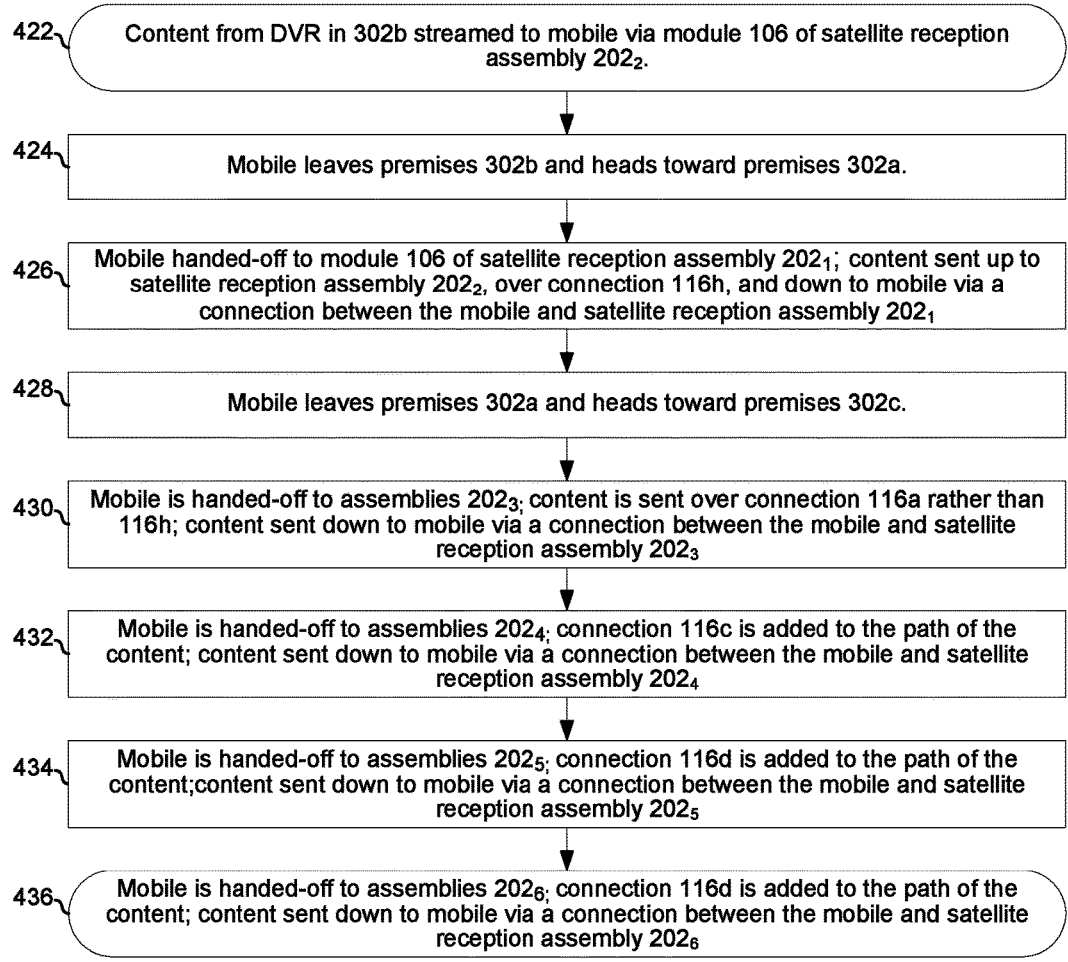
FIG. 4C is a flowchart illustrating support of mobile content delivery via a network of satellite reception assemblies.

FIG. 4C is a flowchart illustrating support of mobile content delivery via a network of satellite reception assemblies. In an example implementation, the content may be delivered to a mobile platform using an existing cellular technology located at the satellite reception assemblies. That is, in such an implementation, the blocks listed below may be implemented by leveraging existing cellular communication systems and technologies. In block 422, content from a digital video recorder installed in satellite customer premises 302a is being streamed to a mobile device via the module 106 of the satellite reception assembly $202_2$.

In block 424, the mobile leaves the premises 302b headed toward premises 302a. In block 426, the mobile is handed-off to the satellite reception assembly $202_1$, the content from the DVR in premises 302b is redirected to the satellite reception assembly $202_1$ via connection 116h, and the satellite reception assembly $202_1$ transmits the content to the mobile device via its module 106.

In block 428, the mobile leaves the premises 302b headed toward premises 302c. In block 430, the mobile is handed-off to the satellite reception assembly $202_3$, the content from the DVR in premises 302b is redirected to the satellite reception assembly $202_3$ via connection 116a rather than connection 116h, and the satellite reception assembly $202_3$ transmits the content to the mobile device via its module 106.

In block 432, as the mobile continues to move toward premises 302c, the mobile is handed-off to the satellite reception assembly $202_4$, and the connection 116c is added to the path of the content from the DVR in premises 302b such that the content reaches the mobile device via a path comprising 116a, 116c, and a connection to the module 106 of satellite reception assembly $202_4$.

In block 434, as the mobile continues to move toward premises 302c, the mobile is handed-off to the satellite reception assembly $202_5$, and the connection 116d is added to the path of the content from the DVR in premises 302b such that the content reaches the mobile device via a path comprising 116a, 116c, 116d, and a connection to the module 106 of satellite reception assembly $202_4$.

In block 436, as the mobile continues to move toward premises 302c, the mobile is handed-off to the satellite reception assembly $202_6$, and the connection 116f is added to the path of the content from the DVR in premises 302b such that the content reaches the mobile device via a path comprising 116a, 116c, 116d, 116f, and a connection to the module 106 of satellite reception assembly $202_4$.

In this manner, the network of satellite reception assemblies may enable mobile delivery of the DVR content without use of the WAN 120.

Figure 4D:
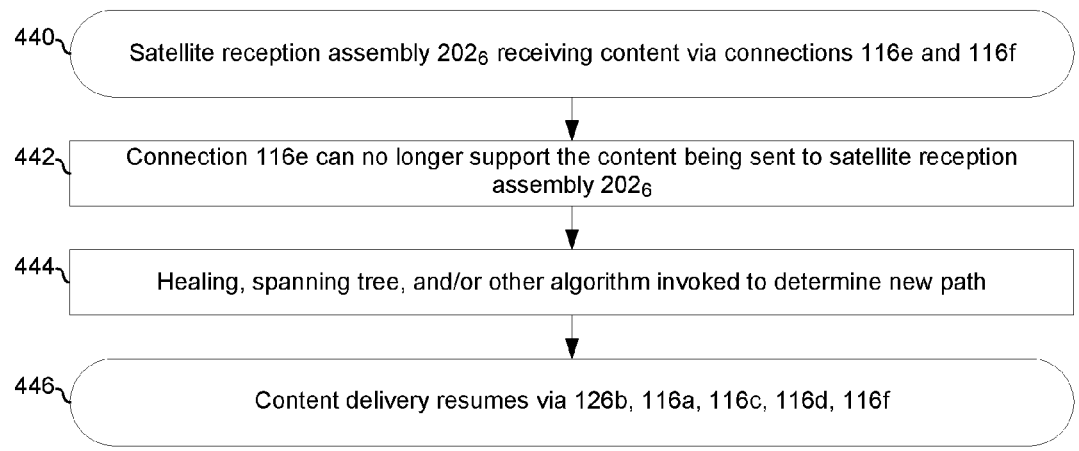
FIG. 4D is a flowchart illustrating self-healing of a network of satellite reception assemblies.

FIG. 4D is a flowchart illustrating self-healing of a network of satellite reception assemblies. In block 440, satellite reception assembly $202_6$ is receiving content from the WAN 120 via connections 116e and 116f. In block 442, the connection 116e becomes unavailable for carrying the content to the satellite reception assembly $202_6$ (e.g., connection 116e is congested or has failed). For example, the connection 116e may fail or higher priority traffic may use up all bandwidth on the connection 116e. In block 444, a healing algorithm, spanning tree algorithm, and/or other mechanism for finding a new path over which to deliver the content from WAN 120 to satellite reception assembly $202_6$ is implemented by the satellite reception assemblies. A path comprising 126b, 116a, 116c, 116d, and 116f is identified. In block 446, delivery of the content resumes using the new path.

Figure 5A:
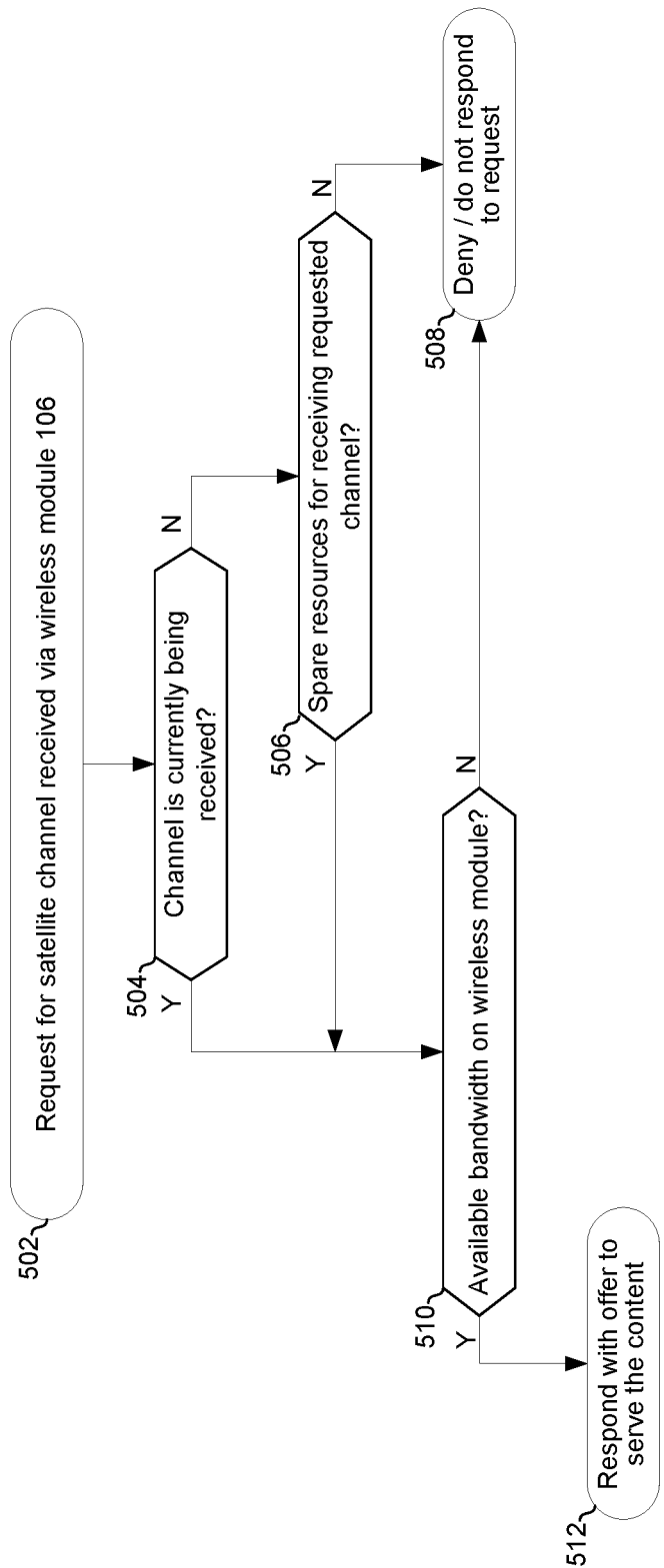
FIG. 5A is a flowchart illustrating discovery of satellite reception assemblies that have available resources for serving satellite content to another satellite reception assembly.

FIG. 5A is a flowchart illustrating discovery of satellite reception assemblies that have available resources for serving satellite content to another satellite reception assembly. In block 502, the satellite reception assembly $202_7$ receives, via connection 116g, a request to receive a satellite channel on behalf of satellite reception assembly $202_6$ and transmit the satellite channel to the satellite reception assembly $202_6$. In block 504, the satellite reception assembly $202_7$ determines whether it is already receiving the requested channel. If the channel is already being received by the satellite reception assembly $202_7$, then, in block 510, the satellite reception assembly $202_7$ determines whether it has available bandwidth in its module 106 to transmit the satellite channel onto the connection 116g. If there is available bandwidth, then in block 512, the satellite reception assembly $202_7$ may respond to the request with an offer to provide the satellite channel to the satellite reception assembly $202_6$.

Returning to block 504, if the satellite reception assembly $202_7$ is not already receiving the requested channel, then, in block 506, the satellite reception assembly $202_7$ determines whether it has available resources (e.g., spare LNB path) for receiving the requested channel. If the satellite reception assembly $202_7$ has sufficient available resources for receiving the requested satellite channel, then the blocks may advance to block 510. If the satellite reception assembly $202_7$ does not have sufficient available resources for receiving the requested satellite channel, then, in block 508, the satellite reception assembly $202_7$ may deny the request or simply not respond to the request.

Figure 5B:
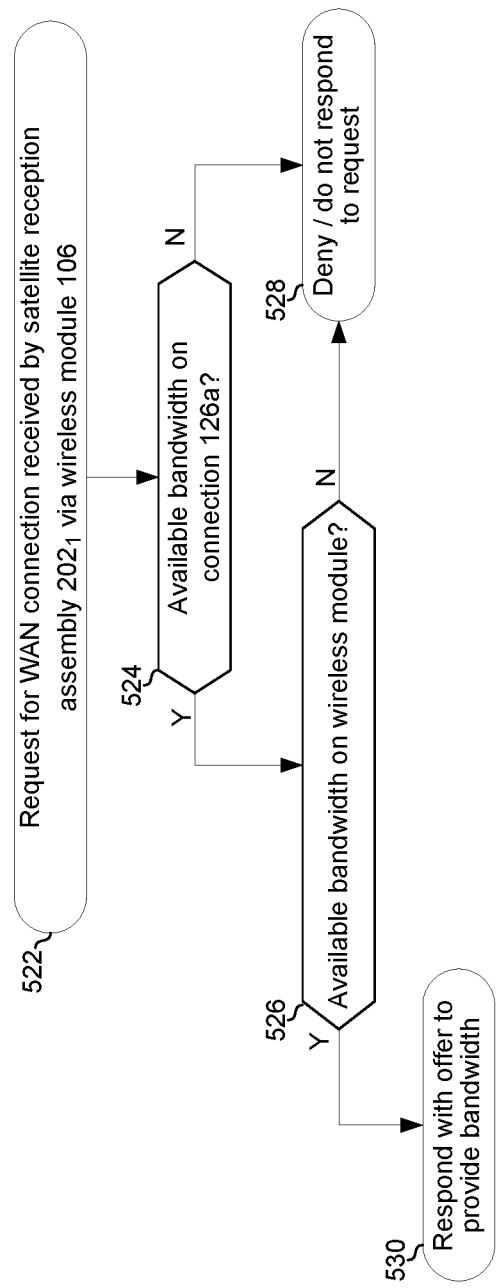
FIG. 5B is a flowchart illustrating discovery of satellite reception assemblies that have available bandwidth for providing WAN connectivity to another satellite reception assembly.

FIG. 5B is a flowchart illustrating discovery of satellite reception assemblies that have available bandwidth for providing WAN connectivity to another satellite reception assembly. In block 522, satellite reception assembly $202_1$ receives a request, from satellite reception assembly $202_2$, to provide a connection to the WAN 120 via the connection 116g. In block 524, the satellite reception assembly $202_1$ determines whether there is available bandwidth on the connection 126a to support the request. This determination may involve, for example, an exchange of messages with a gateway installed at customer premises 302a. If there is sufficient available bandwidth on the connection 126a, then in block 526 the satellite reception assembly $202_1$ determines whether its module 106 has sufficient available bandwidth to handle the traffic between the connection 126a and the satellite reception assembly $202_2$. If there is sufficient available bandwidth, then in block 530, the satellite reception assembly $202_1$ may respond to the request with an offer to provide the satellite channel to the satellite reception assembly $202_2$.

Returning to block 526, if the module 106 of the satellite reception assembly $202_1$ does not have sufficient available resources to handle the traffic between connection 126a and satellite reception assembly $202_2$, then in block 528, the satellite reception assembly $202_1$ may deny the request or simply not respond to the request.

Returning to block 524, if there is not sufficient available bandwidth on the connection 126a to support the traffic to and from the satellite reception assembly $202_2$, then the blocks may proceed to block 528.

Figure 5C:
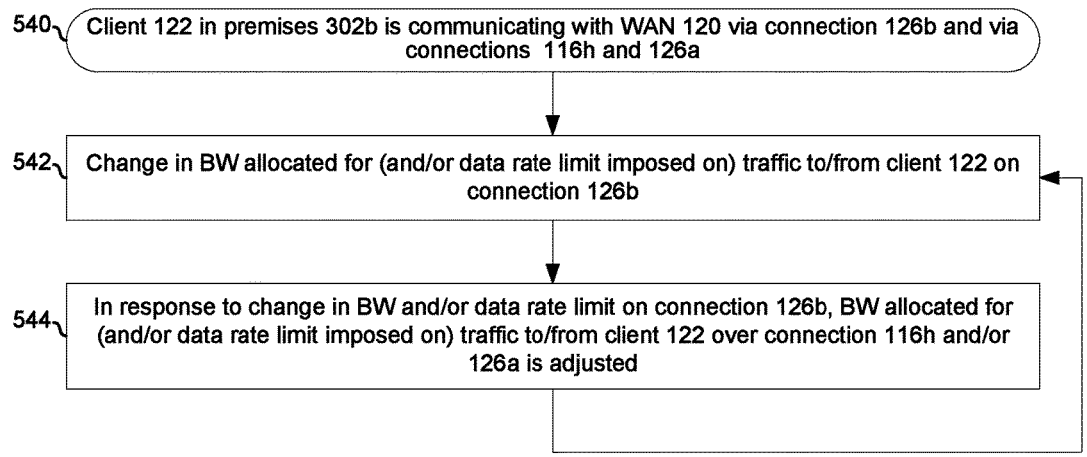
FIG. 5C is a flowchart illustrating coordinated bandwidth allocation and/or traffic shaping between a wireline/fiber connection and an inter-satellite-reception-assembly connection.

FIG. 5C is a flowchart illustrating coordinated bandwidth allocation and/or traffic shaping between a wireline/fiber connection and an inter-satellite-reception-assembly connection. In an example implementation, BW allocated for (and/or data rate limit imposed on) traffic to/from a client on a connection 126 (e.g., a fiber or wireline connection) may be coordinated with BW allocated for (and/or data rate limit imposed on) traffic to/from the client on a connection 116 to a satellite reception assembly that is co-located with the client. FIG. 5C illustrates an example. In block 540, client 122 in premises 302b is communicating with WAN 120 via connection 126b, and also via the path comprising connections 116h and 126a. In block 542, the bandwidth allocated to (and/or the data rate limit imposed on) traffic to/from client 122 on connection 126b is changed (i.e., increased or decreased). The change may be imposed, for example, by the headend and/or by a gateway in the premises 302b implementing a traffic shaping algorithm. In block 544, in response to the change in block 542, the bandwidth allocated to (and/or the data rate limit imposed on) traffic to/from client 122 on connection 116h and/or connection 126a is changed (i.e., increased or decreased). The change in allocated bandwidth may be coordinated by, for example, a control message from the gateway 112 in the premises 302b to the assembly $202_2$. For example, the change in block 544 might be an increase to compensate (at least partially) for a decrease in block 542, and visa-versa. Similarly, a change in bandwidth and/or data rate limit on the connections 116h and/or 126a may be compensated for (at least partially) by a change in bandwidth and/or data rate limit on the connection 126b.

Figure 5D:
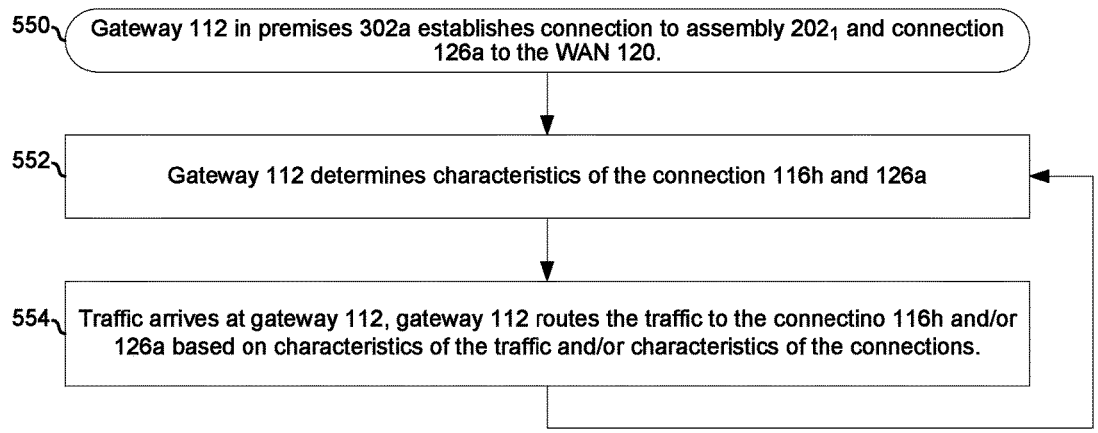
FIG. 5D is a flowchart illustrating traffic shaping by a gateway connected to satellite reception assembly capable of direct wireless communications with other satellite reception assemblies.

FIG. 5D is a flowchart illustrating traffic shaping by a gateway connected to satellite reception assembly capable of direct wireless communications with other satellite reception assemblies. In block 550, a gateway 221 in premises 302a establishes a connection 114 to satellite reception assembly $202_1$ and a connection 126a to WAN 120. The satellite reception assembly $202_1$ in turn establishes a direct wireless connection 116h to satellite reception assembly $202_2$. In block 552, the gateway 112 determines characteristics of a first path to WAN 120 comprising connection 126a, and characteristics of a second path to WAN 210 comprising connections 114, 116h, and 126b. In block 554, traffic destined for the WAN 120 arrives at the gateway 112. The gateway 12 inspects the traffic and determines to route the traffic via the first path or the second path based on quality of service requirements of the traffic and the characteristics of the paths determined in block 552. For example, the gateway 112 may determine which path currently has lower latency and route voice traffic via that path while routing latency-insensitive data via the other path. As another example, for traffic requiring low packet jitter, the gateway 112 may determine which of the paths has lower jitter and may transmit the traffic via that path. Subsequent to block 554, the steps may periodically and/or occasionally return to step 552 to re-learn current characteristics of the two paths.

Although various processes of FIGS. 4A-5D are described as being performed by particular modules (e.g., by module 202) such processes may be performed by other modules (e.g., by gateway 212) or by interoperation of a multiple modules.

Figure 6:
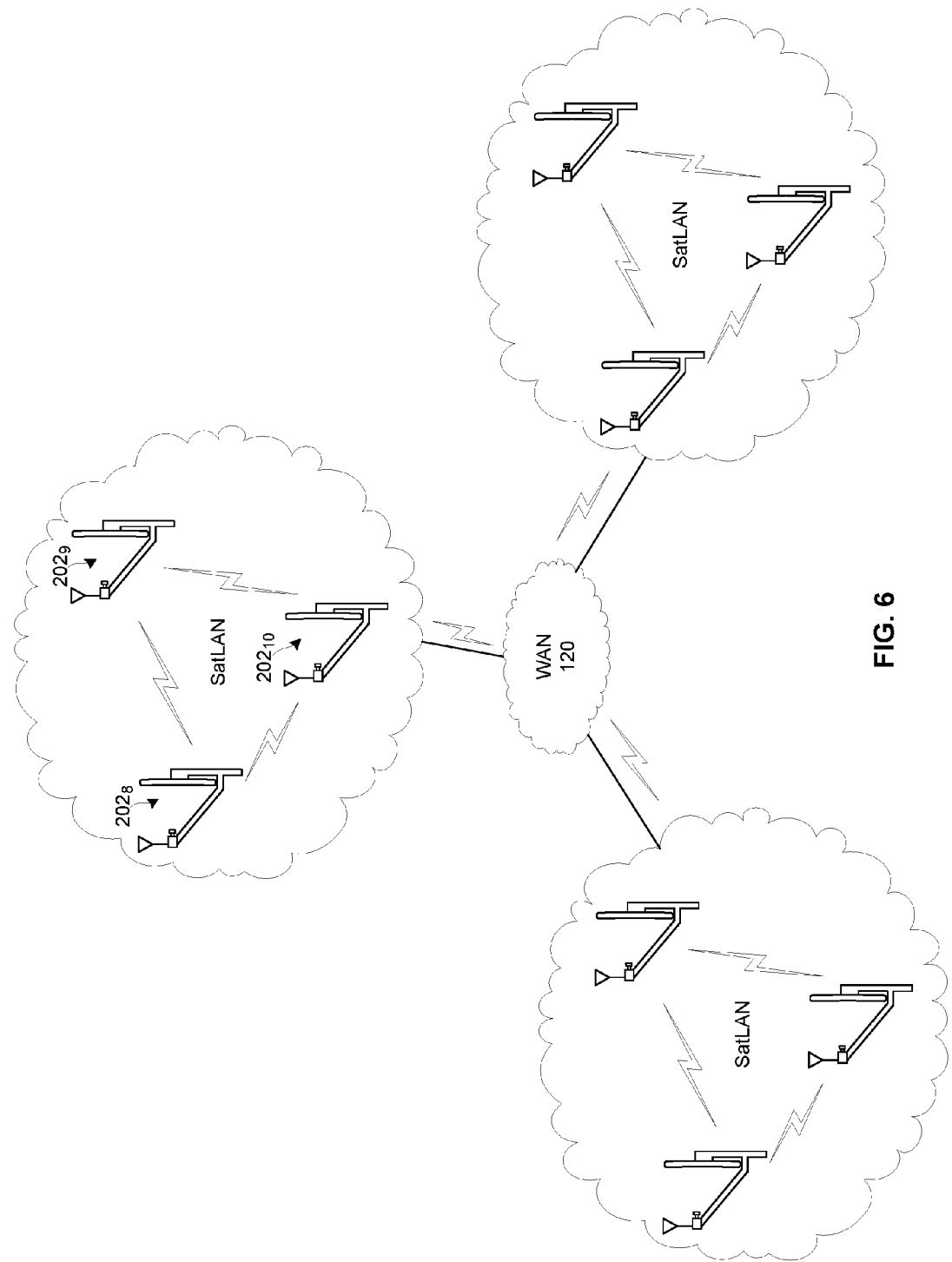
FIG. 6 is a diagram illustrating a network in which local or metropolitan area networks of satellite reception assemblies are interconnected via a wide area network.

FIG. 6 is a diagram illustrating a network in which local or metropolitan area networks of satellite reception assemblies are interconnected via a wide area network. As shown in FIG. 6, a plurality of satellite reception assemblies may be organized into a satellite local area network (SatLAN) which interacts with other SatLANs via a wide area network such as the WAN 120. In this manner, permissions, network addressing, etc. in a particular SatLAN may be similar to permissions, network addressing, etc. of other LAN technologies such as Ethernet. For example, each of satellite reception assemblies $202_8$-$202_{10}$ may be part of a common SatLAN and may be part of a common subnet and/or have common permission settings to various content and/or network resources.

In an example implementation, intra-satLAN traffic and/or inter-SatLAN traffic may be propagated using flooding and/or routing techniques. In an example implementation, where multiple paths exist between two or more satellite reception assemblies, the satellite reception assemblies of a SatLAN may be operable to implement self-healing algorithms to overcome bad and/or broken connections between satellite reception assemblies. In an example implementation, the satellite reception assemblies may be operable to implement one or more protocols such as IEEE 802.11d (Spanning Tree Protocol), IEEE 802.11s (Hybrid Wireless Mesh Protocol), protocols for peer-to-peer or ad-hoc network, and/or similar protocols for managing connections and forwarding/routing of traffic between/among satellite reception assemblies.

FIGS. 7A and 7B illustrate an example implementation in which multiple satellite reception assemblies are networked via a network switch. As shown, each of a plurality of satellite reception assemblies $202_1$-$202_N$ (N being an integer) may be connected to a WAN via a switch/traffic aggregator 702 and a broadband connection 706. As shown in FIG. 7A, the connections $704_1$-$704_N$ between the satellite reception assemblies and the switch 702 may be wired and/or optical. Such connections may be direct connections from the respective modules 108 and/or may be via respective gateway devices. As shown in FIG. 7B, the connections $704_1$-$704_N$ between the satellite reception assemblies and the switch 702 may be wireless connections. The wireless connections may be direct wireless connections between the respective modules 106 and the switch 702.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein for a mesh network of satellite reception assemblies.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   a first satellite reception assembly and a second satellite reception assembly, wherein
   said first satellite reception assembly and said second satellite reception assembly are configured such that a satellite signal received via a satellite broadcast receiver of said first satellite reception assembly can be delivered to said second satellite reception assembly via a direct wireless connection, wherein:
      said communication via said direct wireless connection comprises a determination of times at which said first satellite reception assembly will have resources available for reception of said satellite signal on behalf of said second satellite reception assembly; and
      said reception of said satellite signal by said first satellite reception assembly, and delivery of said satellite signal to said second satellite reception assembly, is scheduled based on said determined times.

2. The system of claim 1, wherein delivery of said satellite signal over said direct wireless connection is triggered in response to degradation of received signal strength by said satellite broadcast receiver of said second satellite reception assembly.

3. A system comprising:
   a first satellite reception assembly and a second satellite reception assembly, wherein
   said first satellite reception assembly and said second satellite reception assembly are configured such that a satellite signal received via a satellite broadcast receiver of said first satellite reception assembly can be delivered to said second satellite reception assembly via said direct wireless connection, wherein:
      said communication via said direct wireless connection comprises a determination that said second satellite reception assembly does not have a spare low noise block downconverter (LNB) path for reception of said satellite signal, and said first satellite reception assembly does have a spare LNB path for reception of said satellite signal; and
      delivery of said satellite signal over said direct wireless connection is triggered in response to said determination.

4. The system of claim 3, wherein delivery of said satellite signal over said direct wireless connection is triggered in response to a request by a client device for satellite content not carried in a satellite signal received via said satellite broadcast receiver of said second satellite reception assembly.

5. The system of claim 3, wherein said first satellite reception assembly and said second satellite reception assembly are configured such that data received from a client device via an interface of said first satellite reception assembly can be delivered to said second satellite reception assembly via said direct wireless connection.

6. The system of claim 5, wherein delivery of said data over said direct wireless connection is triggered in response to congestion of a broadband connection that serves said client device.

7. The system of claim 5, wherein delivery of said data over said direct wireless connection is triggered in response to a determination of resources available in said first satellite reception assembly.

8. The system of claim 5, wherein delivery of said data over said direct wireless connection is triggered in response to a determination of resources available in said second satellite reception assembly.

9. The system of claim 5, wherein delivery of said satellite signal over said direct wireless connection is triggered in response to a request by a second client device for satellite content not carried in a satellite signal received by said second satellite reception assembly.

10. A system comprising:
a first satellite reception assembly and a second satellite reception assembly, wherein
said first satellite reception assembly and said second satellite reception assembly are configured such that data received from a client device via an interface of said first satellite reception assembly can be delivered to said second satellite reception assembly via said direct wireless connection, wherein delivery of said data over said direct wireless connection is triggered in response to congestion of a broadband connection that serves said client device.

11. The system of claim 10, wherein delivery of said data over said direct wireless connection is triggered in response to a determination of resources available in said first satellite reception assembly.

12. The system of claim 10, wherein delivery of said data over said direct wireless connection is triggered in response to a determination of resources available in said second satellite reception assembly.

13. The system of claim 10, wherein said first satellite reception assembly and said second satellite reception assembly are configured such that satellite television content received via a satellite broadcast receiver of said first satellite reception assembly can be delivered to said second satellite reception assembly via said direct wireless connection.

14. The system of claim 13, wherein delivery of said satellite television content over said direct wireless connection is triggered in response to degradation of received signal strength by said satellite broadcast receiver of said second satellite reception assembly.

15. The system of claim 13, wherein delivery of said satellite television content over said direct wireless connection is triggered in response to a determination of resources available in said first satellite reception assembly.

16. The system of claim 13, wherein delivery of said satellite television content over said direct wireless connection is triggered in response to a determination of resources available in said second satellite reception assembly.

17. The system of claim 13, wherein delivery of said satellite television content over said direct wireless connection is triggered in response to a request by a second client device for satellite content not carried in a satellite signal received by said second satellite reception assembly.

* * * * *